United States Patent [19]

Ohgoda et al.

[11] Patent Number: 4,855,599
[45] Date of Patent: Aug. 8, 1989

[54] RADIATION IMAGE READ-OUT APPARATUS

[75] Inventors: Makoto Ohgoda; Toshitaka Agano, both of Kanagawa, Japan

[73] Assignee: Fuji Photo Film Co., Ltd., Kanagawa, Japan

[21] Appl. No.: 172,540

[22] Filed: Mar. 24, 1988

[30] Foreign Application Priority Data

Mar. 24, 1987 [JP] Japan .................................. 62-69650

[51] Int. Cl.⁴ ............................................. G03B 42/00
[52] U.S. Cl. ................................ 250/327.2; 250/484.1
[58] Field of Search ................... 250/327.2 K, 327.2 J, 250/484.1 B

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 9/1982 | Kato et al. | 364/515 |
| 4,387,428 | 6/1983 | Ishida et al. | 364/414 |
| 4,761,554 | 8/1988 | Yoshimura et al. | 250/327.2 |

FOREIGN PATENT DOCUMENTS

| 0125800 | 11/1984 | European Pat. Off. |
| 0169345 | 1/1986 | European Pat. Off. |
| 0231926 | 8/1987 | European Pat. Off. |
| 56-11395 | 2/1981 | Japan | 250/327.2 |
| 58-67240 | 4/1983 | Japan |
| 62-16666 | 1/1987 | Japan |

Primary Examiner—Constantine Hannaher
Attorney, Agent, or Firm—Sughrue, Mion, Zinn, Macpeak & Seas

[57] ABSTRACT

A radiation image read-out apparatus comprises a stimulable phosphor sheet feeding section for housing and feeding out a stimulable phosphor sheet carrying a radiation image stored thereon, an image read-out section, an erasing section for erasing radiation energy remaining on the stimulable phosphor sheet, and a stimulable phosphor sheet housing section for housing the stimulable phosphor sheet on which erasing has been finished at the erasing section. These sections are provided one above another. A sheet conveyance system extending vertically for receiving the stimulable phosphor sheet from the stimulable phosphor sheet feeding section, conveying the stimulable phosphor sheet into and out of the image read-out section and the erasing section, and conveying the stimulable phosphor sheet into the stimulable phosphor sheet housing section is provided in horizontal relation to the respective sections.

14 Claims, 1 Drawing Sheet

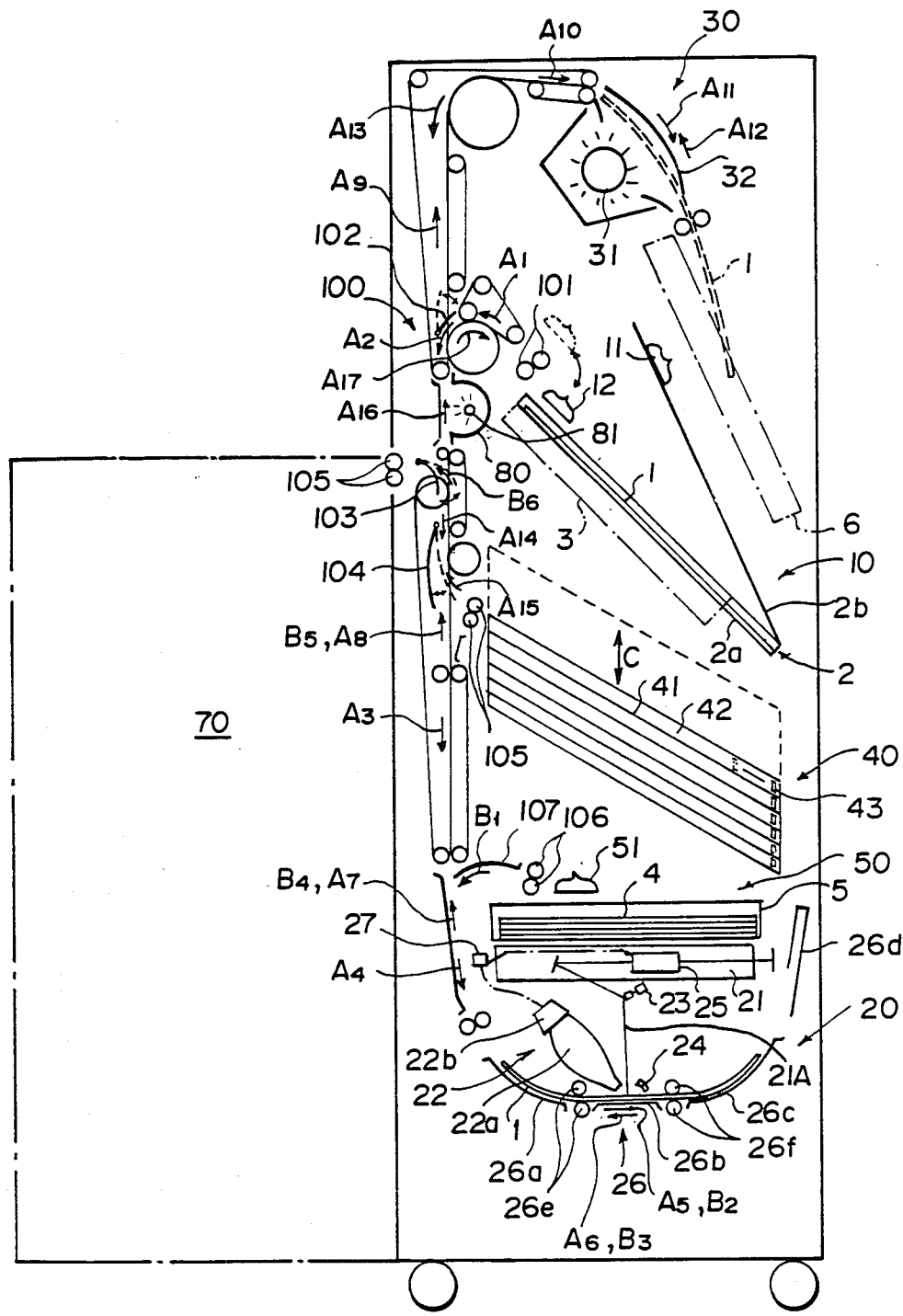

RADIATION IMAGE READ-OUT APPARATUS

BACKGROUND OF THE INVENTION

1. Field of the Invention

This invention relates to a radiation image readout apparatus for use in a radiation image recording and reproducing system. This invention particularly relates to a radiation image read-out apparatus which is adapted to installation in a small floor space.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through a object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

The proposed radiation image read-out apparatus is provided with the image read-out section, the erasing section, a stimulable phosphor sheet feeding section for holding a cassette which houses therein a single image-recorded stimulable phosphor sheet carrying a radiation image stored thereon by use of an external image recording apparatus or a magazine which houses a plurality of the image-recorded stimulable phosphor sheets, and feeding out the image-recorded stimulable phosphor sheet from the cassette or the magazine, and a stimulable phosphor sheet housing section for holding a cassette or a tray for housing therein an erased reusable stimulable phosphor sheet on which image read-out and erasing have been finished. The stimulable phosphor sheet taken out of the stimulable phosphor sheet feeding section is conveyed to the image read-out section, the erasing section, and the stimulable phosphor sheet housing section in this sequence by a stimulable phosphor sheet conveyance means. As for the conveyance paths of the stimulable phosphor sheet conveyance means, the conveyance path from the stimulable phosphor sheet feeding section to the image read-out section, the conveyance path from the image read-out section to the erasing section, and the conveyance path from the erasing section to the stimulable phosphor sheet housing section are formed independently of one another.

In recent years, it is required to make small the aforesaid radiation image recording and reproducing system as whole, and to make the aforesaid radiation image read-out apparatus as compact as possible for this purpose. Particularly, if the bottom area of the radiation image read-out apparatus could be made small, it would become possible to decrease the space required for the installation of the read-out apparatus. However, with the conventional read-out apparatus wherein a plurality of the conveyance paths of the stimulable phosphor sheet conveyance means are formed independently of one another, the stimulable phosphor sheet feeding section, the image read-out section, the erasing section, and the stimulable phosphor sheet housing section must be put side by side on the conveyance paths, the width of the read-out apparatus becomes large, and the bottom area of the read-out apparatus cannot be decreased so much.

SUMMARY OF THE INVENTION

The primary object of the present invention is to provide a radiation image read-out apparatus wherein a stimulable phosphor sheet conveyance means is simplified and the bottom area of the read-out apparatus is made small.

Another object of the present invention is to provide a radiation image read-out apparatus which is adapted to installation in a small space.

The present invention provides a first radiation image read-out apparatus comprising:

(i) a stimulable phosphor sheet feeding section for housing therein at least one stimulable phosphor sheet carrying a radiation image stored thereon, and feeding out said housed stimulable phosphor sheet, (ii) an image read-out section for carrying out read-out of said radiation image by conveying said stimulable phosphor sheet in a sub-scanning direction by use of a sub-scanning conveyance means, at the same time scanning said stimulable phosphor sheet in a main scanning direction by a light beam deflected one-dimensionally, thereby to cause said stimulable phosphor sheet to emit light carrying said radiation image, and detecting the emitted light, (iii) an erasing section for erasing radiation energy remaining on said stimulable phosphor sheet after image read-out from said stimulable phosphor sheet has been finished at said image read-out section, and (iv) a stimulable phosphor sheet housing section for housing therein said stimulable phosphor sheet on which erasing has been finished at said erasing section, wherein said stimulable phosphor sheet feeding section, said image read-out section, said erasing section, and said stimulable phosphor sheet housing section are provided one above another, and a sheet conveyance means extending vertically, capable of conveying said stimulable phosphor sheet upward and downward by an arbitrary distance, and capable of receiving said stimulable phosphor sheet from said stimulable phosphor sheet feeding section, conveying said stimulable phosphor sheet into and out of said image read-out section and said erasing section, and conveying said stimulable phosphor sheet into said stimulable phosphor sheet housing section is provided in horizontal relation to said stimulable phosphor sheet feeding section, said image read-out section, said erasing section, and said stimulable phosphor sheet housing section.

The stimulable phosphor sheet feeding section may be a cassette holding section for housing therein the stimulable phosphor sheet carrying the radiation image stored thereon in the form housed in a cassette, or may be a magazine holding section for housing therein a plurality of the image-recorded stimulable phosphor sheets in the form housed in a magazine. Also, the stimulable phosphor sheet feeding section may be composed of both the cassette holding section and the magazine holding section. In the case where the stimulable phosphor sheet feeding section is constituted by the cassette holding section, the stimulable phosphor sheet taken out of the cassette is often returned into said original cassette after being sent to the image read-out section and then to the erasing section. In this case, the stimulable phosphor sheet feeding section acts also as the stimulable phosphor sheet housing section.

With the radiation image read-out apparatus wherein the stimulable phosphor sheet conveyance means for conveying the stimulable phosphor sheet vertically is provided, and the stimulable phosphor sheet feeding section, the image read-out section, the erasing section, and the stimulable phosphor sheet housing section are provided one above another in horizontal relation to the stimulable phosphor sheet conveyance means, a desired means can be provided in horizontal relation to the stimulable phosphor sheet conveyance means besides the aforesaid sections. The radiation image which has been read out at the image read-out section is reproduced as a visible image by, for example, scanning a recording sheet with a light beam modulated in accordance with the image signals detected at the image read-out section and recording the radiation image on the recording sheet. The reproducing apparatus for the image reproduction has heretofore been provided independently of the read-out apparatus. However, in the case where the components constituting the reproducing apparatus are provided in horizontal relation to the sheet conveyance means, thereby to form the image read-out section and the reproducing apparatus integrally with each other, the radiation image recording and reproducing system as a whole can be made smaller.

Accordingly, the present invention also provides a second radiation image read-out apparatus comprising:

(i) a stimulable phosphor sheet feeding section for housing therein at least one stimulable phosphor sheet carrying a radiation image stored thereon, and feeding out said housed stimulable phosphor sheet, (ii) an image read-out section for carrying out read-out of said radiation image by conveying said stimulable phosphor sheet in a sub-scanning direction by use of a sub-scanning conveyance means, at the same time scanning said stimulable phosphor sheet in a main scanning direction by a light beam deflected one-dimensionally, thereby to cause said stimulable phosphor sheet to emit light carrying said radiation image, and detecting the emitted light, (iii) an erasing section for erasing radiation energy remaining on said stimulable phosphor sheet after image read-out from said stimulable phosphor sheet has been finished at said image read-out section, (iv) a stimulable phosphor sheet housing section for housing therein said stimulable phosphor sheet on which erasing has been finished at said erasing section, (v) a recording sheet feeding section for housing therein recording sheets and feeding out said housed recording sheets one by one, and (vi) an image reproducing section for recording said radiation image on said recording sheet by conveying said recording sheet in a sub-scanning direction by use of a sub-scanning conveyance means and, at the same time, scanning said recording sheet in a main scanning direction by a light beam modulated in accordance with said radiation image, which has been read out at said image read-out section, and deflected one-dimensionally, wherein said stimulable phosphor sheet feeding section, said image read-out section, said erasing section, said stimulable phosphor sheet housing section, said recording sheet feeding section, and said image reproducing section are provided one .above another, and a sheet conveyance means extending vertically, capable of conveying said stimulable phosphor sheet and said recording sheet upward and downward by an arbitrary distance, and capable of receiving said stimulable phosphor sheet from said stimulable phosphor sheet feeding section, receiving said recording sheet from said recording sheet feeding section, conveying said stimulable phosphor sheet into and out of said image read-out section and said erasing section, conveying said recording sheet into and out of said image reproducing section, and conveying said stimulable phosphor sheet into said stimulable phosphor sheet housing section is provided in horizontal relation to said stimulable phosphor sheet feeding section, said image read-out section, said erasing section, said stimulable phosphor sheet housing section, said recording sheet feeding section, and said image reproducing section.

The image read-out section and the image reproducing section should preferably be formed integrally with each other at least by utilizing a single sub-scanning conveyance means in common for the conveyance of the stimulable phosphor sheet and the recording sheet in the sub-scanning direction.

With the radiation image read-out apparatus in accordance with the present invention wherein the stimulable phosphor sheet feeding section, the image read-out section, the erasing section, and the stimulable phosphor sheet housing section are provided one above another and the sheet conveyance means extending vertically and capable of conveying the stimulable phosphor sheet vertically is provided in horizontal relation to these sections, the conveyance of the stimulable phosphor sheet and the conveyance thereof into and out of the aforesaid sections can all be carried out by the stimulable phosphor sheet conveyance means. Therefore, the combination of the aforesaid sections can be made vertically long, and a single simple conveyance path for the stimulable phosphor sheet can be formed vertically. As a result, the bottom area of the radiation image read-out apparatus in accordance with the present invention becomes small, the read-out apparatus can be installed in a floor space smaller than in the case of the conventional read-out apparatus, and the layout for the apparatus can be designed more freely.

BRIEF DESCRIPTION OF THE DRAWING

The single drawing is a schematic side view showing an embodiment of the radiation image read-out apparatus in accordance with the present invention.

DESCRIPTION OF THE PREFERRED EMBODIMENTS

The present invention will hereinbelow be described in further detail with reference to the accompanying drawing.

An embodiment of the radiation image read-out apparatus shown is provided with a cassette holding section 10 as a stimulable phosphor sheet feeding section for releasably holding a cassette 2 capable of housing a stimulable phosphor sheet 1 therein, an image read-out section 20 for reading out a radiation image stored on the stimulable phosphor sheet 1, an erasing section 30 for erasing radiation energy remaining on the stimulable phosphor sheet 1 after image read-out therefrom is finished at the image read-out section 20, and a stacker 40 capable of housing a plurality of the stimulable phosphor sheets 1, 1, ... therein and feeding out the housed stimulable phosphor sheets 1, 1, ... one after another. The cassette holding section 10 also acts as a stimulable phosphor sheet housing section for housing the stimulable phosphor sheet 1 on which erasing has been finished at an erasing section 30 as will be described later. The sections 10, 20, 30 and 40 are provided one above another, and a stimulable phosphor sheet conveyance means 100 extends vertically beside these sections. The aforesaid sections 10, 20, 30 and 40 are connected with the stimulable phosphor sheet conveyance means 100.

The stimulable phosphor sheet 1 has been subjected to image recording in an external image recording apparatus (not shown) in the form housed in the cassette 2, and the cassette 2 housing the image-recorded stimulable phosphor sheet 1 is fed to the cassette holding section 10. The cassette 2 is light-tight so that the stimulable phosphor sheet 1 is prevented from exposure to external light when it is exposed to a radiation to have a radiation image recorded thereon. The cassette 2 comprises a cassette body 2a in which the stimulable phosphor sheet 7 is to be housed and an openable cover member 2b. When the cassette 2 is fed into the cassette holding section 10, the cover member 2b is maintained in the closed position. When the stimulable phosphor sheet 1 is to be taken out of the cassette 2 at the cassette holding section 10, the cover member 2b is opened as shown by a cover opening means 11 constituted by a suction cup or the like. After the cover member 2b is opened, a stimulable phosphor sheet take-out means 12 constituted by a suction cup or the like advances into the cassette 2, and sucks and takes the stimulable phosphor sheet 1 out of the cassette 2. The stimulable phosphor sheet take-out means 12 then transfers the stimulable phosphor sheet 1 to nip rollers 101 constituting a part of the stimulable phosphor sheet conveyance means 100 in the vicinity of the cassette 2. The stimulable phosphor sheet 1 has been housed in the cassette 2 with its front surface provided with a stimulable phosphor layer facing down.

The stimulable phosphor sheet conveyance means 100 is composed of endless belts, guide plates, rollers, and sheet distributing means. The stimulable phosphor sheet 1 whose leading edge portion is grasped between the nip rollers 101 is conveyed by the stimulable phosphor sheet conveyance means 100 in the direction as indicated by the arrow A1, guided by the sheet distributing means 102 positioned as indicated by the solid line, and conveyed in the direction as indicated by the arrow A2. The stimulable phosphor sheet 1 is then conveyed in the directions as indicated by the arrows A3 and A4 to the image read-out section 20. Also, a secondary erasing section 80 is provided in the conveyance path of the stimulable phosphor sheet 1 for carrying out secondary erasing by an erasing light source 81 as will be described later. The erasing light source 81 is maintained off at the time the stimulable phosphor sheet 1 taken out of the cassette holding section 10 is conveyed from above the secondary erasing section 80. Also, at the time the stimulable phosphor sheet 1 taken out of the cassette 2 is directly sent to the image read-out section 20, sheet distributing means 103 and 104 between the secondary erasing section 80 and the image read-out section 20 are maintained at the positions as indicated by the solid lines, and allow the stimulable phosphor sheet 1 to be conveyed downward.

The image read-out section 20 is operated for scanning the stimulable phosphor sheet 1 carrying a radiation image stored thereon by a laser beam 21A as stimulating rays which cause the stimulable phosphor sheet 1 to emit light in proportion to the stored radiation energy, and photoelectrically detecting the emitted light by a photoelectric read-out means 22 constituted by a photomultiplier or the like to obtain electric image signals for use in reproduction of a visible image. Reference numeral 21 denotes, by way of example, a He—Ne laser beam source, and reference numeral 23 denotes a light deflector such as a galvanometer mirror. Reference numeral 24 designates a reflection mirror for reflecting the light emitted by the stimulable phosphor sheet 1 towards a light guide member 22a of the photoelectric read-out means 22. The light guide member 22a guides the light through total reflection therein up to a photodetector 22b constituted by a photomultiplier or the like. Reference numeral 25 denotes a light modulator such as an acousto-optic modulator (AOM), which is not activated when the laser beam 21A scans the stimulable phosphor sheet 1.

The stimulable phosphor sheet 1 sent to the image read-out section 20 is conveyed by a conveyance means 26 composed of guide plates 26a, 26b, 26c and 26d, and nip rollers 26e and 26f in the direction as indicated by the arrow A5, and the overall surface of the stimulable phosphor sheet 1 is scanned two-dimensionally by the laser beam 21A deflected approximately normal to the direction of conveyance and caused by the laser beam 21A to emit light in proportion to the stored radiation energy. The light emitted by the stimulable phosphor sheet 1 in the course of the scanning is photoelectrically detected by the photodetector 22b via the light guide member 22a. The emitted light is converted by the photodetector 22b into electric image signals, and the electric signals thus obtained are sent to an image processing circuit 27 for carrying out image processing on the electric signals. After the image read-out from the overall surface of the stimulable phosphor sheet 1 is finished, the leading edge of the stimulable phosphor sheet 1 contacts a guide plate 26d with the tailing edge thereof being grasped between nip rollers 26f. From this position, the stimulable phosphor sheet 1 is switched back and conveyed in the direction as indicated by the arrow A6.

As for the radiation image read-out, there has heretofore been known a method wherein preliminary readout for approximately ascertaining the radiation image stored on the stimulable phosphor sheet 1 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the stimulable phosphor sheet 1 with stimulating rays having stimulation energy of a level lower than the level of the stimulation energy of the laser beam (stimulating rays) used in the final read-out, and detecting the light emitted by the stimulable phosphor sheet 1 in the course of the scanning by a photoelectric read-out means.

The image read-out section 20 may be constituted to carry out only the final read-out or both the preliminary read-out and the final read-out. For example, the preliminary read-out may be carried out by conveying the stimulable phosphor sheet 1 in the direction as indicated by the arrow A5, the stimulable phosphor sheet 1 may then be switched back and reversely conveyed in the direction as indicated by the arrow A6 to the read-out start position, and then the final read-out may be carried out while the stimulable phosphor sheet 1 is again conveyed in the direction as indicated by the arrow A5. The optical members at the image read-out section 20 are not limited to those as mentioned above. For example, as proposed in Japanese Patent Application No. 60(1985)-156255, a long photomultiplier may be disposed along the main scanning line as the photoelectric read-out means for detecting the light emitted by the stimulable phosphor sheet 1.

A comparatively long time is taken for carrying out the image read-out at the image read-out section 20, and therefore it often occurs that processing of the stimulable phosphor sheets cannot be achieved efficiently in the case where a cassette 2 housing a new image-recorded stimulable phosphor sheet 1 is loaded to the cassette holding section 10 after processing of the preceding stimulable phosphor sheet 1 is finished at the image read-out section 20. Accordingly, this embodiment is provided with the stacker 40, so that the stimulable phosphor sheet 1 fed out of the cassette holding section 10 may be conveyed into the stacker 40 and made to wait for conveyance to the image read-out section 20 in accordance with the condition of the image read-out section 20.

The stacker 40 comprises a plurality of stimulable phosphor sheet housing compartments 42, 42, . . . defined by partitions 41, 41, . . . , and is moveable vertically in the direction as indicated by the arrow C between the position as indicated by the solid line and the position as indicated by the broken line, so that every stimulable phosphor sheet housing compartment 42 can face nip rollers 105 disposed in the vicinity of the stacker 40. In the course of conveying the stimulable phosphor sheet 1 fed out of the cassette holding section 10 into the stacker 40, the sheet distributing means 104 is moved to the position as indicated by the broken line for guiding the stimulable phosphor sheet 1 conveyed from above toward the stacker 40. The stimulable phosphor sheet 1 is conveyed into a predetermined stimulable phosphor sheet housing compartment 42 of the stacker 40. After the tailing edge of the stimulable phosphor sheet 1 separates from the nip rollers 105, the stimulable phosphor sheet 1 falls by its weight and is held with its leading edge contacting a stopper 43 in the stimulable phosphor sheet housing compartment 42. When the stimulable phosphor sheet 1 is to be fed out of the stacker 40, the stacker 40 is moved until the stimulable phosphor sheet housing compartment 42 in which the stimulable phosphor sheet 1 is housed faces the nip rollers 105, the stopper 43 is then moved to the position as indicated by the broken line to push up the stimulable phosphor sheet 1 and to have the leading edge portion of the stimulable phosphor sheet 1 grasped by the nip rollers 105. The stimulable phosphor sheet 1 grasped by the nip rollers 105 is guided by the sheet distributing means 104 maintained at the position as indicated by the broken line, is conveyed upward by the stimulable phosphor sheet conveyance means 100, and is then conveyed in the directions as indicated by the arrows A3 and A4 into the image read-out section 20. At this time, the stimulable phosphor sheet 1 fed out of the stacker 40 is once conveyed upward in this manner so that the surface of the stimulable phosphor sheet 1 provided with a stimulable phosphor faces up (i.e. the laser beam irradiation side) at the image read-out section 20.

After the image read-out from the stimulable phosphor sheet 1 is finished at the image read-out section 20, the stimulable phosphor sheet 1 is conveyed by the stimulable phosphor sheet conveyance means 100 in the directions as indicated by the arrows A7, A8, A9 and A10 into the erasing section 30. At this time, the sheet distributing means 102 is maintained at the position as indicated by the broken line, and the sheet distributing means 103 and 104 are maintained at the positions as indicated by the solid lines.

At the erasing section 30, radiation energy remaining on the stimulable phosphor sheet 1 after the image read-out therefrom is finished is erased. Specifically, a part of the radiation energy stored on the stimulable phosphor sheet 1 at the image recording step remains stored thereon after the image read-out is carried out. In order to reuse the stimulable phosphor sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the stimulable phosphor sheet 1 is exposed to the erasing light emitted by the erasing light sources 31, 31, . . . for releasing the residual radiation energy from the stimulable phosphor sheet 1 while the stimulable phosphor sheet 1 is conveyed along a guide plate 32 in the direction as indicated by the arrow A11. At the erasing section 30, any known erasing method may be used. For example, erasing may be conducted by heating or by a combination of exposure to the erasing light with heating. The stimulable phosphor sheet 1 is reversely conveyed in the direction as indicated by the arrow A12 after being conveyed up to the position as indicated by the broken line, and a guide plate for supporting the edge of the stimulable phosphor sheet 1 should preferably be provided outside of the erasing section 30. Also, as will be described later, in the case where a stimulable phosphor sheet housing tray 6 is provided close to the erasing section 30, the tray 6 may be utilized as a guide.

After erasing of the stimulable phosphor sheet 1 is finished at the erasing section 30, the stimulable phosphor sheet 1 is conveyed by the stimulable phosphor sheet conveyance means 100 in the directions as indicated by the arrows A13 and A14, and is housed in the empty stimulable phosphor sheet hosing compartment 42 of the stacker 40 by being guided by the sheet distributing means 104 moved to the position as indicated by the broken line. In the case where some erased reusable stimulable phosphor sheets 1, 1, . . . are housed in the stacker 40 in this manner, the erased reusable stimulable phosphor sheet 1 can be conveyed into the empty cassette 2 immediately after the image-recorded stimulable phosphor sheet 1 was fed out of the cassette 2 at the cassette holding section 10. When the stimulable phosphor sheet 1 is to be fed out of the stacker 40 and conveyed to the cassette holding section 10, the sheet distributing means 104 is moved to the position as indicated by the broken line, the sheet distributing means 102 and 103 are moved to the positions as indicated by the solid lines, and the stimulable phosphor sheet 1 is conveyed by the stimulable phosphor sheet conveyance means 100 in the directions as indicated by the arrows A15, A16 and A17 into the cassette 2. The stimulable phosphor sheet 1 conveyed out of the stacker 40 may have often been maintained in the stacker 40 and a long time may have elapsed after the stimulable phosphor sheet 1 was subjected to erasing at the erasing section 30. In the case where at least a predetermined time elapses after the erasing was carried out on the stimulable phosphor sheet 1, the stimulable phosphor sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the stimulable phosphor sheet 1 cause noise in a radiation image recorded next on the stimulable phosphor sheet 1. In order to prevent noise generation, the secondary erasing section 80 for irradiating the erasing light to the stimulable phosphor sheet 1 is disposed in the conveyance path between the stacker 40 and the cassette holding section 10. The erasing light source 81 at the secondary erasing section 80 is turned on only when the stimulable phosphor sheet 1 fed out of the stacker 40 is conveyed toward the cassette holding section 10, thereby to release the radiation energy stored on the stimulable phosphor sheet 1 while the stimulable phosphor sheet 1 is being housed in the stacker 40. The cassette 2 loaded with the erased reusable stimulable phosphor sheet 1 in this manner is taken out of the read-out apparatus for reuse in image recording. In this embodiment, the stimulable phosphor sheet 1 erased at the erasing section 30 may be immediately conveyed into the cassette 2. In this case, the stimulable phosphor sheet 1 conveyed in the direction as indicated by the arrow A13 from the erasing section 30 may once be conveyed downward, then switched back upward and conveyed into the cassette 2. As a result, the surface of the stimulable phosphor sheet 1 provided with the stimulable phosphor layer can be made to face down when the stimulable phosphor sheet 1 is housed in the cassette 2.

On the other hand, in an external image recording apparatus, besides the image recording on the stimulable phosphor sheet 1 housed in the cassette 2, image recording may be carried out on a plurality of the stimulable phosphor sheets 1, 1, . . . taken one by one out of a sheet feed magazine for continuous image recording or the like. The stimulable phosphor sheets 1, 1, . . . each carrying a radiation image stored thereon are sequentially housed in a sheet housing magazine, which is then sent to a read-out apparatus. As the stimulable phosphor sheet feeding section, the read-out apparatus in accordance with the present invention may be provided with the aforesaid cassette holding section 10, and a magazine holding section disposed for releasably holding the stimulable phosphor sheet magazine (i.e. the aforesaid sheet housing magazine) in a horizontal relation to the stimulable phosphor sheet conveyance means 100, so that the read-out and erasing can be carried out also for the stimulable phosphor sheets fed out of the stimulable phosphor sheet magazine. The magazine holding section may be provided at any position insofar as it approximately aligns with the aforesaid image read-out section 20, the erasing section 30 and other sections in the vertical direction and is connected with the stimulable phosphor sheet conveyance means 100. Also, as indicated by the chain line in the drawing, the cassette holding section 10 and the magazine holding section may be formed integrally with each other so that the cassette holding section 10 can be loaded with both the cassette 2 and a stimulable phosphor sheet magazine 3. In the case where the magazine holding section is provided, it is necessary to provide a tray holding section for holding a tray in which the stimulable phosphor sheets fed one by one out of the stimulable phosphor sheet magazine and subjected to the image read-out and erasing are to be housed. The tray holding section may be provided at any position connected with the stimulable phosphor sheet conveyance means 100. However, the tray holding section should preferably be provided outward from the erasing section 30 so that the tray 6 is positioned adjacent the erasing section 30 as indicated by the chain line in the drawing. In this case, as for the stimulable phosphor sheet 1 fed out of the cassette 2, the tray 6 can act in the same manner as a guide for guiding the stimulable phosphor sheet 1 in the course of the erasing. Also, as for the stimulable phosphor sheet fed out of the stimulable phosphor sheet magazine, the stimulable phosphor sheet can be made to fall into the tray 6 and housed therein after the erasing is finished.

On the other hand, this embodiment is constituted for carrying out, besides the aforesaid image read-out and erasing, reproduction of the read-out radiation image on a recording sheet. Specifically, a recording sheet feeding section 50 for releasably holding a recording sheet feed magazine 5 which houses therein a plurality of recording sheets 4, 4, . . . is provided above the image read-out section 20. Also, the image read-out section 20 acts in the same manner as an image reproducing section for reproduction of the radiation image. Reproduction of the radiation image in this embodiment will be described hereinbelow.

At the time the image read-out from the stimulable phosphor sheet 1 has been finished at the image read-out section 20 and the stimulable phosphor sheet 1 has been conveyed out of the image read-out section 20, a single recording sheet 4 is taken by a suction means 51 out of the recording sheet feed magazine 5 at the recording sheet feeding section 50, and transferred to nip rollers 106 in the vicinity of the recording sheet feeding section 50. The recording sheet 4 is conveyed by the nip rollers 106 along a guide plate 107 in the direction as indicated by the arrow B1, and is then conveyed by the stimulable phosphor sheet conveyance means 100 into the image read-out section 20 in the same manner as the stimulable phosphor sheet 1. At the image read-out section 20, the radiation image which was read from the stimulable phosphor sheet 1 in the manner as mentioned above is recorded on the recording sheet 4 while the recording sheet 4 is being conveyed by the aforesaid conveyance means 26 in the direction as indicated by the arrow B2.

At the time the recording sheet 4 is thus conveyed in the image read-out section 20, the light modulator 25 is operated in accordance with the image signals which were detected from the stimulable phosphor sheet 1, and the operation of the photodetector 22b is stopped. The recording sheet 4 is scanned by the laser beam 21A now acting as the recording light modulated by the light modulator 25 and deflected by the light deflector 23, so that the radiation image which was stored on the stimulable phosphor sheet 1 is reproduced over the overall surface of the recording sheet 4.

After the image reproduction on the recording sheet 4 is finished at the image read-out section 20, the recording sheet 4 is conveyed by the stimulable phosphor sheet conveyance means 100 in the directions as indicated by the arrows B3, B4 and B5. At this time, the sheet distributing means 104 is maintained at the position as indicated by the solid line, and the sheet distributing means 103 is moved to the position as indicated by the broken line, thereby to guide the recording sheet 4 in the direction as indicated by the arrow B6 and to have the leading edge of the recording sheet 4 grasped between ejection rollers 105. By way of example, the ejection rollers 105 may convey the recording sheet 4 to an automatic developing section 70 connected to the read-out apparatus. Alternatively, a tray or the like may be positioned close to the ejection rollers 105, and the recording sheets 4, 4, . . . may be sequentially ejected into the tray or the like. Also, a holding section for the recording sheet housing tray may be provided inside of the read-out apparatus, and the recording sheets 4, 4, . . . may be taken out of the apparatus in the form housed in the tray and sent to an external automatic developing machine.

At the image read-out section 20, the reproduction of the radiation image read out from a single stimulable phosphor sheet 1 is carried out on a single recording sheet 4 immediately after the image read-out is carried out on the stimulable phosphor sheet 1. Instead, the image read-out may be carried out continuously for a plurality of the stimulable phosphor sheets at the image read-out section 20, image signals thus detected may be stored in a memory, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets. Also, from the viewpoint of making the apparatus small and reducing the manufacture cost thereof, the image read-out section 20 should preferably be formed integrally with the image reproducing section by utilizing the conveyance means and the laser beam scanning system in common in the manner as mentioned above. However, the image reproducing section may be formed besides the stimulable phosphor sheet conveyance means independently of the image read-out section.

As the recording sheet, besides the ordinary silver halide photographic film, a dry silver suitable for heat development or the like may be used. Also, besides the photosensitive recording materials, a heat-sensitive recording material may also be used. As the development process in the case where the silver halide photographic film is used, a wet development process, an instant process or the like may be used.

Though the aforesaid embodiment is constituted to carry out the image reproduction besides the image read-out and erasing, the radiation image read-out apparatus in accordance with the present invention may be constituted to carry out only the image read-out and erasing. In this case, the recording sheet feeding section 50 may be omitted and the image read-out section 20 may be constituted to carry out the image read-out alone. Also, the configuration of the stimulable phosphor sheet conveyance means, and the configuration and layout of the respective sections are not limited to those in the aforesaid embodiment. For example, besides the aforesaid cassette holding section, a second cassette holding section for holding an empty cassette into which the erased reusable stimulable phosphor sheet is to be fed may be provided, and the stimulable phosphor sheet feeding section and the stimulable phosphor sheet housing section may thus be separated from each other. Also, in the case where processing of a stimulable phosphor sheet may be carried out after processing of the preceding stimulable phosphor sheet have been finished, the stacker may be omitted to make the apparatus smaller.

We claim:

1. A radiation image read-out apparatus comprising:
   (i) a stimulable phosphor sheet feeding section for housing therein at least one stimulable phosphor sheet carrying a radiation image stored thereon, and feeding out said housed stimulable phosphor sheet,
   (ii) an image read-out section for carrying out read-out of said radiation image by conveying said stimulable phosphor sheet in a sub-scanning direction by use of a sub-scanning conveyance means, at the same time scanning said stimulable phosphor sheet in a main scanning direction by a light beam deflected one-dimensionally, thereby to cause said stimulable phosphor sheet to emit light carrying said radiation image, and detecting the emitted light,
   (iii) an erasing section for erasing radiation energy remaining on said stimulable phosphor sheet after image read-out from said stimulable phosphor sheet has been finished at said image read-out section, and
   (iv) a stimulable phosphor sheet housing section for housing therein said stimulable phosphor sheet on which erasing has been finished at said erasing section,
   wherein said stimulable phosphor sheet feeding section, said image read-out section, said erasing section, and said stimulable phosphor sheet housing section are provided one above another so as to vertically overlap one another, and
   a vertically extending sheet conveyance means disposed on one side of each of said sections for receiving said sheet from said feeding section, respectively conveying said sheet into and out of said read-out section and said erasing section and conveying said sheet into said housing section by reciprocatingly conveying said sheet along said conveyance means.

2. An apparatus as defined in claim 1 wherein said stimulable phosphor sheet feeding section is a cassette holding section for housing therein said stimulable phosphor sheet carrying the radiation image stored thereon in the form housed in a cassette.

3. An apparatus as defined in claim 1 wherein said stimulable phosphor sheet feeding section is a magazine holding section for housing therein a plurality of image recorded stimulable phosphor sheets in the form housed in a magazine.

4. A radiation image read-out apparatus comprising:
(i) a stimulable phosphor sheet feeding section for housing therein at least one stimulable phosphor sheet carrying a radiation image stored thereon, and feeding out said housed stimulable phosphor sheet,
(ii) an image read-out section for carrying out read-out of said radiation image by conveying said stimulable phosphor sheet in a sub-scanning direction by use of a sub-scanning conveyance means, at the same time scanning said stimulable phosphor sheet in a main scanning direction by a light beam deflected one-dimensionally, thereby to cause said stimulable phosphor sheet to emit light carrying said radiation image, and detecting the emitted light,
(iii) an erasing section for erasing radiation energy remaining on said stimulable phosphor sheet after image read-out from said stimulable phosphor sheet has been finished at said image read-out section,
(iv) a stacker section capable of housing a plurality of stimulable phosphor sheets and feeding out said housed stimulable phosphor sheets one by one, and
(v) a stimulable phosphor sheet housing section for housing therein said stimulable phosphor sheet on which erasing has been finished at said erasing section,
wherein said stimulable phosphor sheet feeding section, said image read-out section, said erasing section, said stacker section, and said stimulable phosphor sheet housing section are provided one above another so as to vertically overlap one another, and
a vertically extending sheet conveyance means disposed on one side of each of said sections for receiving said sheet from said feeding section, respectively conveying said sheet into and out of said read-out section, said erasing section and said stacker section and conveying said sheet into said housing section by reciprocatingly conveying said sheet along said conveyance path.

5. An apparatus as defined in claim 4 wherein said stimulable phosphor sheet feeding section is a cassette holding section for housing therein said stimulable phosphor sheet carrying the radiation image stored thereon in the form housed in a cassette.

6. An apparatus as defined in claim 4 wherein said stimulable phosphor sheet feeding section is a magazine holding section for housing therein a plurality of image recorded stimulable phosphor sheets in the form housed in a magazine.

7. A radiation image read-out apparatus comprising:
(i) a stimulable phosphor sheet feeding section for housing therein at least one stimulable phosphor sheet carrying a radiation image stored thereon, and feeding out said housed stimulable phosphor sheet,
(ii) an image read-out section for carrying out read-out of said radiation image by conveying said stimulable phosphor sheet in a sub-scanning direction by use of a sub-scanning conveyance means, at the same time scanning said stimulable phosphor sheet in a main scanning direction by a light beam deflected one-dimensionally, thereby to cause said stimulable phosphor sheet to emit light carrying said radiation image, and detecting the emitted light,
(iii) an erasing section for erasing radiation energy remaining on said stimulable phosphor sheet after image read-out from said stimulable phosphor sheet has been finished at said image read-out section,
(iv) a stimulable phosphor sheet housing section for housing therein said stimulable phosphor sheet on which erasing has been finished at said erasing section,
(v) a recording sheet feeding section for housing therein recording sheets and feeding out said housed recording sheets one by one, and
(vi) an image reproducing section for recording said radiation image on said recording sheet by conveying said recording sheet in a sub-scanning direction by use of a sub-scanning conveyance means and, at the same time, scanning said recording sheet in a main scanning direction by a light beam modulated in accordance with said radiation image, which has been read out at said image read-out section, and deflected one-dimensionally,
wherein said stimulable phosphor sheet feeding section, said image read-out section, said erasing, said stimulable phosphor sheet housing section, said recording sheet feeding section, and said image reproducing section are provided one above another so as to vertically overlap one another, and
a vertically extending sheet conveyance means disposed on one side of each of said sections for receiving said sheet from said stimulable phosphor sheet feeding section and from said recording sheet feeding section, respectively conveying said sheet into and out of said image read-out section, said erasing section and said image reproducing section, and conveying said sheet into said stimulable phosphor sheet housing section by reciprocatingly conveying said sheet along said conveyance means.

8. An apparatus as defined in claim 7 wherein said image read-out section and said image reproducing section are formed integrally with each at least by utilizing said sub-scanning conveyance means in common for the conveyance of said stimulable phosphor sheet and said recording sheet in the sub-scanning direction.

9. An apparatus as defined in claim 7 wherein said stimulable phosphor sheet feeding section is a cassette holding section for housing therein said stimulable phosphor sheet carrying the radiation image stored thereon in the form housed in a cassette.

10. An apparatus as defined in claim 7 wherein said stimulable phosphor sheet feeding section is a magazine holding section for housing therein a plurality of image-recorded stimulable phosphor sheets in the form housed in a magazine.

11. A radiation image read-out apparatus comprising:
(i) a stimulable phosphor sheet feeding section for housing therein at least one stimulable phosphor sheet carrying a radiation image stored thereon, and feeding out said housed stimulable phosphor sheet, (ii) an image read-out section for carrying out read-out of said radiation image by conveying said stimulable phosphor sheet in a sub-scanning direction by use of a sub-scanning conveyance means, at the same time scanning said stimulable phosphor sheet in a main scanning direction by a light beam deflected one-dimensionally, thereby to cause said stimulable phosphor sheet to emit light carrying said radiation image, and detecting the emitted light, (iii) an erasing section for erasing radiation energy remaining on said stimulable phosphor sheet after image read-out from said stimulable phosphor sheet has been finished at said image read-out section, (iv) a stacker section capable of housing a plurality of stimulable phosphor sheets and feeding out said housed stimulable phosphor sheets one by one, (v) a stimulable phosphor sheet housing section for housing therein said stimulable phosphor sheet on which erasing has been finished at said erasing section, (vi) a recording sheet feeding section for housing therein recording sheets and feeding out said housed recording sheets one by one, and (vii) an image reproducing section for recording said radiation image on said recording sheet by conveying said recording sheet in a sub-scanning direction by use of a sub-canning conveying means and, at the same time, scanning said recording sheet in a main scanning direction by a light beam modulated in accordance with said radiation image, which has been read out at said image read-out section, and deflected one-dimensionally, wherein said stimulable phosphor sheet feeding section, said image read-out section, said erasing section, said stacker section, said stimulable phosphor sheet housing section, said recording sheet feeding section, and said image reproducing section are provided one above another so as to vertically overlap one another, and a vertically extending sheet conveyance means disposed on one side of each of said sections for receiving said sheet from said stimulable phosphor sheet feeding section and said recording sheet feeding section, respectively conveying said sheet into and out of said image read-out section, said erasing section, said stacker section and said image reproducing section, and conveying said sheet into said stimulable phosphor sheet housing section by reciprocatingly conveying said sheet along said conveyance means.

12. An apparatus as defined in claim 11 wherein said image read-out section and said image reproducing section are formed integrally with each other at least by utilizing said sub-scanning conveyance means in common for the conveyance of said stimulable phosphor sheet and said recording sheet in the sub-scanning direction.

13. An apparatus as defined in claim 11 wherein said stimulable phosphor sheet feeding section is a cassette holding section for housing therein said stimulable phosphor sheet carrying the radiation image stored thereon in the form housed in a cassette.

14. An apparatus as defined in claim 11 wherein said stimulable phosphor sheet feeding section is a magazine holding section for housing therein a plurality of image-recorded stimulable phosphor sheets in the form housed in a magazine.

* * * * *